US008103120B2

(12) United States Patent
Choi et al.

(10) Patent No.: US 8,103,120 B2
(45) Date of Patent: Jan. 24, 2012

(54) METHOD AND APPARATUS OF LOCAL CONTRAST ENHANCEMENT

(75) Inventors: Wai Pak Choi, Hong Kong (HK); Stephen Wai-Yan Lai, Hong Kong (HK); Wing Chi Stephen Chan, Hong Kong (HK)

(73) Assignee: Solomon Systech Limited, New Territories (HK)

( * ) Notice: Subject to any disclaimer, the term of this patent is extended or adjusted under 35 U.S.C. 154(b) by 791 days.

(21) Appl. No.: 12/234,895

(22) Filed: Sep. 22, 2008

(65) Prior Publication Data

US 2010/0074553 A1 Mar. 25, 2010

(51) Int. Cl.
*G06K 9/40* (2006.01)

(52) U.S. Cl. ....... 382/274; 382/260; 382/275; 358/3.26; 358/3.27

(58) Field of Classification Search .................. 382/260, 382/274, 275; 358/3.26, 3.27, 463
See application file for complete search history.

(56) References Cited

U.S. PATENT DOCUMENTS

| | | | | |
|---|---|---|---|---|
| 4,231,065 | A | 10/1980 | Fitch | |
| 4,825,297 | A | 4/1989 | Fuchsberger | |
| 5,883,984 | A | 3/1999 | Huang | |
| 5,930,402 | A | 7/1999 | Kim | |
| 5,978,518 | A | 11/1999 | Oliyide et al. | |
| 6,069,979 | A | 5/2000 | VanMetter | |
| 6,453,076 | B1 | 9/2002 | Nakajima | |
| 6,771,320 | B2 | 8/2004 | Choi | |
| 6,990,249 | B2 * | 1/2006 | Nomura | 382/254 |
| 7,027,662 | B2 * | 4/2006 | Baron | 382/275 |
| 7,283,240 | B2 * | 10/2007 | Mestha et al. | 356/402 |
| 7,319,545 | B2 * | 1/2008 | Linder et al. | 358/1.9 |
| 2003/0156761 | A1 | 8/2003 | Ogata et al. | |
| 2003/0161497 | A1 | 8/2003 | Vuylsteke | |
| 2003/0161549 | A1 | 8/2003 | Lei | |
| 2007/0009167 | A1 | 1/2007 | Dance | |
| 2007/0009168 | A1 | 1/2007 | Kim | |
| 2008/0019608 | A1 | 1/2008 | Zuro | |

FOREIGN PATENT DOCUMENTS

| | | |
|---|---|---|
| EP | 1404120 A1 | 3/2004 |
| WO | WO2008/011541 A2 | 1/2008 |
| WO | WO2008/026847 A1 | 3/2008 |

* cited by examiner

*Primary Examiner* — Yosef Kassa
(74) *Attorney, Agent, or Firm* — Ella Cheong Hong Kong; Margaret A. Burke; Sam T. Yip

(57) ABSTRACT

Methods and apparatuses of contrast enhancement on an image are disclosed. The method performs local shading of fine contrast variations in an image, with particular advantage in tone mapping applications. The amounts of shading are determined by the preferred degree of increased image contrast 810, including compensation for subsequent tone mapping, and the difference between a profile signal 803 and the image signal 801 conditional on the signal profile level being higher than the original image signal level, wherein avoiding boosting of brightness level to obtain contrast enhancement. The profile signal 803 is calculated by the weighted sum of the image signal and the absolute signal variation which is the absolute value of the variation between the brightness of two neighbor pixels. This amount of shading is reduced to zero when the profile signal 803 is lower than the original image signal 801 for avoiding the overshooting problem at sharp edges in an image. Uniform RGB scaling is applied to preserve original color tones.

15 Claims, 13 Drawing Sheets

METHOD AND APPARATUS OF LOCAL CONTRAST ENHANCEMENT

TECHNICAL FIELD

The present invention relates generally to methods and devices for local contrast enhancement in image signal processing systems, and more specifically to methods and devices for processing image signal data to minimize the loss of fine image contrast caused by tone mapping for dynamic backlight control in display system applications.

BACKGROUND

Tone mapping is a technique used in image processing and computer graphics to map a set of colors to another set so as to approximate the appearance of high dynamic range images in media with a more limited dynamic range. However, tone mapping may fail to reproduce the full range of light intensities present in natural scenes and may cause problematic contrast reduction from the scene values to the displayable range. Preserving the fine image details and color tones in the original scenes are important in many applications.

Recently, Dynamic Backlight Control (DBC) in mobile Liquid Crystal Display (LCD) device has become one of the image display applications in applying the tone mapping for scaling up the image data while dimming the backlight so as to minimize the backlight power consumption. However, the image data loses its accuracy during the tone mapping especially in high brightness region.

Therefore, the art would benefit greatly from image data processing methods that can avoid the loss of fine image details or contrast in dynamic backlight control applications.

SUMMARY

Method for local contrast enhancement may employ a two-dimensional recursive filter to obtain a moving average of the intensity variations in all areas of the display. This moving average is subtracted from the original signal to produce a signal which contains only local variations and this latter signal is expanded or amplified to increase the display contrast.

Another method for local contrast enhancement is to low pass filter the input signal and to add the low pass filtered value to the enhanced contrast value. A final output g is obtained according to the following expression (1).

$$g=K1(m)+K2(f-m) \quad (1)$$

wherein, K1 and K2 designate characteristics curves, m designates an output of the low pass filter, and f designates an input of the low pass filter.

Another similar method of local contrast enhancement is performed by weighting a signal according to the magnitude of the local contrast of the signal and by adding the weighted signal to the original signal, thereby being capable of outputting the original signal intact regardless of the value of the local contrast. A final output y is obtained according to the following expression (2).

$$y=x+f(|x-m|)(x-m) \quad (2)$$

wherein, f( ) designates the weighting function of |x−m|, m designates an output of the low pass filter, and x designates an input of the low pass filter.

Another method of local contrast enhancement that focuses on the edge-enhanced features is performed by filter processing to generate an edge-enhanced signal, capable of reducing required memory capacity and power consumption. A further method involves applying a band-pass filter processing to an input image pixel in multiple directions to generate an overall sum-of-border value.

In the foregoing methods, the requirements for compensating and adjusting for the loss of fine image contrast due to the tone mapping are not dealt with. Specifically, there are no considerations for the characteristics of tone-mapping curves and the subsequent effects of tone-mapping in their methods. Furthermore, the above methods perform amplification of the contrast signal, boosting and shading, of the image contrast signal. However, contrast signal boosting suffers from the problem of signal saturation and clipping for signal levels in the high brightness region, resulting in image contrast loss or washout.

It is an objective of the presently claimed invention to provide a method of local contrast enhancement that requires only one-dimensional data processing. Such method is efficient for hardware implementation since the algorithm does not require block or two-dimensional approach.

It is another objective of the presently claimed invention to provide a method of local contrast enhancement that can compensate the image loss caused by signal saturation or signal clipping of image signals at high brightness levels when applying tone mapping.

It is a further objective of the presently claimed invention to provide a method of local contrast enhancement that enhances the contrast of a signal by shading. The shading produces amplified lowering of the signal levels at signal valleys, thus avoiding the problem of signal clipping or signal saturation encountered at high brightness level.

It is a further objective of the presently claimed invention to provide a method of local contrast enhancement that applies signal shading with consideration to minimize effect on the overall brightness level of the image by means of variable scaling control to limit most of the shading to the high brightness regions of an image, where small shading is not visually perceivable and is visually favorable.

It is a further objective of the presently claimed invention to provide a method of local contrast enhancement that provides uniform scaling of the RGB color stream data and ensures the conservation of image color tones.

It is a further objective of the presently claimed invention to provide a method of local contrast enhancement that takes into consideration of tone-mapping characteristics used in dynamic backlight control to facilitate aggressive saving of power consumption in an electronic image display system.

It is a further objective of the presently claimed invention to provide a method of local contrast enhancement that suppresses overshooting problem of the local contrast in sharp edged images, which is especially common in user interface applications.

Aspects of the presently claimed invention have been developed with a view to enhance image contrast for the compensation of fine image contrast loss due to tone mapping used especially for Dynamic Backlight Control (DBC) System in Liquid Crystal Display. After applying the tone mapping, some of the fine contrast signals in the high brightness region will be reduced, clipped, or saturated according to tone-mapping curve under the dynamic backlight control. The quality of an image is degraded and its fine contrast details are washed out or reduced beyond perception. This method of the presently claimed invention can be used to enhance the fine local contrast signals in a particular manner before applying the tone mapping so as to pre-compensate for the contrast reduction effects from tone mapping.

In certain embodiments, the algorithm is composed of five blocks which include a multiplexer, a summation of two weighted sum filters, a contrast shading equation, a contrast shading table and a RGB scaling. The first part includes a multiplexer to select the signal with highest value among the RGB components of the pixel image data to be the reference image signal for processing. The second part is the summation of two weighted sum filters used to form a profile signal according to the image signal. The two filters calculate a weighted sum of the image signal and a weighted sum of the absolute signal variation, over a number of neighboring pixels. The next part is to calculate a shaded value by subtracting the amount of shading, which is represented as a product of two factors, from the image signal. The first factor is an envelop contrast signal value calculated by subtracting the image signal from the profile signal. The second factor is a map value from a lookup table used to compensate the effect of the tone-mapping curve on the image signal. In addition, this amount of shading is set to zero if negative in value in order to avoid the overshooting problem at sharp edges in an image. Finally, the last part is the RGB Scaling where the RGB signal components of the pixel image data is scaled by the same scale factor which is determined as the ratio of the shaded value to the reference image signal.

In one exemplary embodiment, a multiplexer selects the highest signal among the RGB input stream data as the representative image signal input for digital signal processing to determine the amount of local shading.

In another exemplary embodiment, the method performs local enhancement of unidirectional contrast in the roll-off region of the tone-mapping curves in applying dynamic backlight control. In-line digital filters and arithmetic logic units in the module process the selected signal input to generate a profile signal using a weighted sum means of the signal input stream and a weighted sum means of the absolute signal variance between adjacent pixel data.

In a further exemplary embodiment, the algorithm applies scaled shading to the signal value to generate a new signal value, the ratio of this new signal value and the original signal value constitutes the RGB color component scaling factor for use in pre-processing of the RGB color stream data before tone-mapping used in DBC.

In yet another exemplary embodiment, the amount of shading is made proportional to the amount of the signal level below the profile signal level, thus achieving the unidirectional or shading contrast enhancement effect.

In a further exemplary embodiment, the module has a contrast shading table controllable by the dimming index used in DBC, the same dimming index that determines the tone-mapping curve used in DBC.

Other aspects of the invention are also disclosed.

BRIEF DESCRIPTION OF DRAWINGS

Embodiments of the invention are described in more detail hereinafter with reference to the drawings, in which.

DETAILED DESCRIPTION

Improved methods and apparatuses of local enhancement on image signal are disclosed herein. In the following description, numerous specific details, including filter sizes, image curves, image histograms, tone-mapping curves, contrast curves, and the like are set forth. However, from this disclosure, it will be apparent to those skilled in the art that modifications, including additions and/or substitutions may be made without departing from the scope and spirit of the invention. In other circumstances, specific details may be omitted so as not to obscure the invention. Nonetheless, the disclosure is written as to enable one skilled in the art to practice the teachings of the embodiments of the invention without undo experimentation.

The presently claimed patent application relates to methods of local enhancement of image data and corresponding hardware designs that are used for compensating the fine image contrast loss due to tone mapping, especially for applications such as Dynamic Backlight Control (DBC) System in Liquid Crystal Display. The fine image contrast loss occurs after applying tone mapping to an image, in which the details of the image in the brightness regions either become saturated or clipped, hence the quality of the resulting image is degraded.

Table 1 shows a list of variables which are used hereinafter in the description of the presently claimed invention.

TABLE 1

| | |
|---|---|
| RGB Color Input | (R, G, B) |
| RGB Color Output | (R', G', B') |
| Representative Image Signal | P |
| Shaded Image Signal | P' |
| Profile Signal | Pc |
| Contrast Shading Table | C(P) |
| Degree of Contrast Effect which can be adjusted by user | α |

Figure 1:
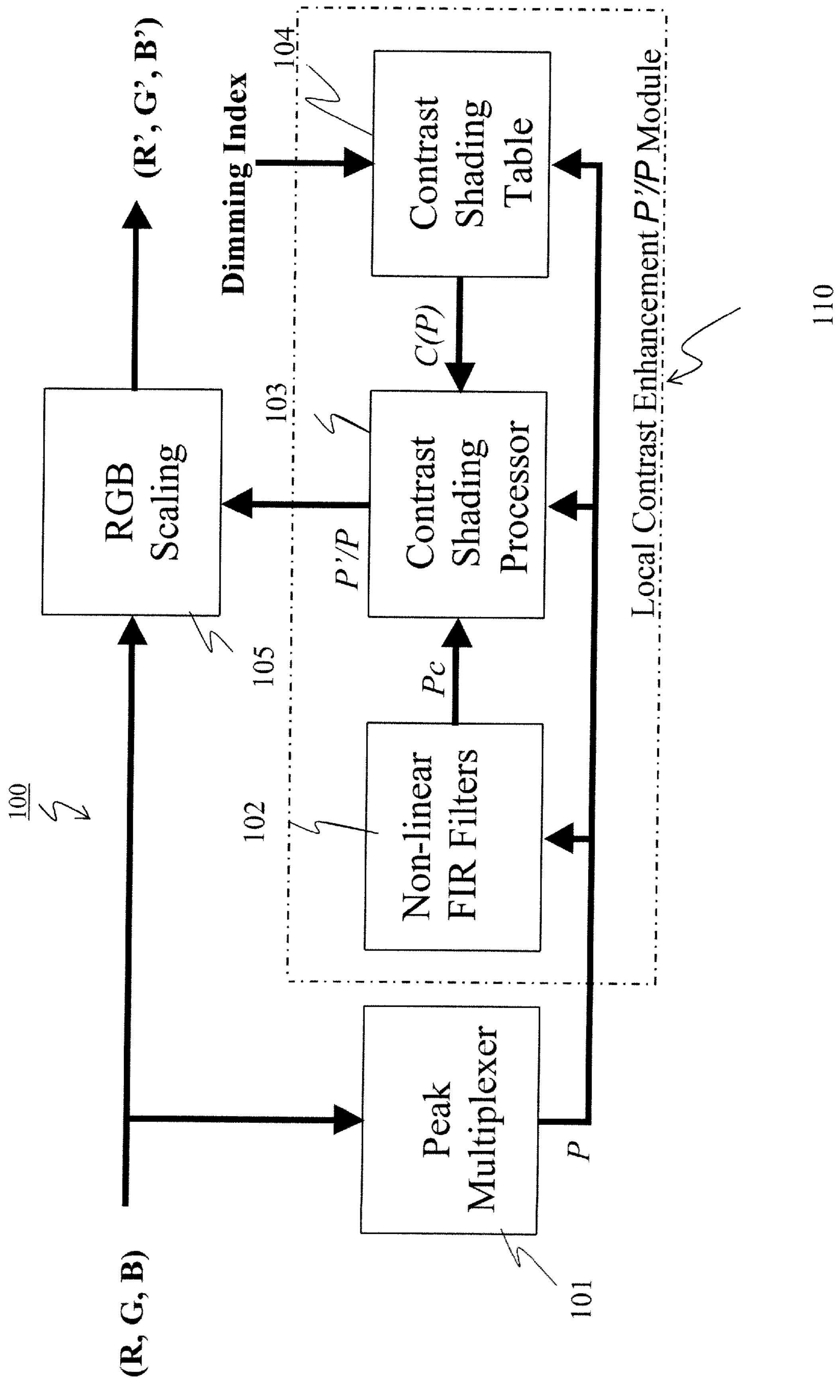
FIG. 1 shows an exemplary block diagram of local contrast enhancement according to the presently claimed invention.

FIG. 1 is a block diagram of a local contrast enhancement system 100 on an image signal according to an embodiment of the claimed invention. In an exemplary embodiment, the algorithm is composed of five main blocks including a multiplexer 101, a non-linear FIR filters 102, a contrast shading processor 103, a contrast shading table 104 and a RGB scaling unit 105. The first part of the local contrast enhancement system 100 includes a multiplexer 101 for selecting the largest value among the RGB components of the pixel image data to be the representative image signal P for further processing to determine the local scaling factor (P'/P) for contrast enhancement.

In another exemplary embodiment, color signal is obtained based on YUV format instead of RGB format. For YUV format application, the presently claimed invention will use Y signal as the representative image signal.

The second part of the local contrast enhancement system 100 is the local contrast enhancement P'/P module 110 which further comprises a non-linear FIR filters generator 102 for producing a profile signal from the summation of two weighted sum filters according to the image signal. The two filters respectively calculate a weighted sum of the image signal and a weighted sum of the absolute variation of the image signal. The local contrast enhancement P'/P module 110 additionally includes a processor 103 for calculating a shaded image signal by subtracting a conditional amount of shading from the original image signal. The conditional amount of shading is represented as a product of two factors extracted from the image signal. The first factor is the amount that the image signal level resides below the profile signal level. The second factor is a map value retrieved from a lookup table 104 used to compensate the effect of the tone-mapping curve on the image signal, determined by the dimming index under dynamic backlight control. In one exemplary embodiment, the amount of conditional shading is set to zero when the image signal level is higher than the profile signal level, in order to avoid the overshooting problem at sharp edges in the image.

The local contrast enhancement system 100 further includes a RGB scaling unit 105 where RGB values of the pixel data are scaled uniformly by a local scaling factor determined as the ratio of shaded image signal to the original representative image signal (P'/P).

Figure 2A:
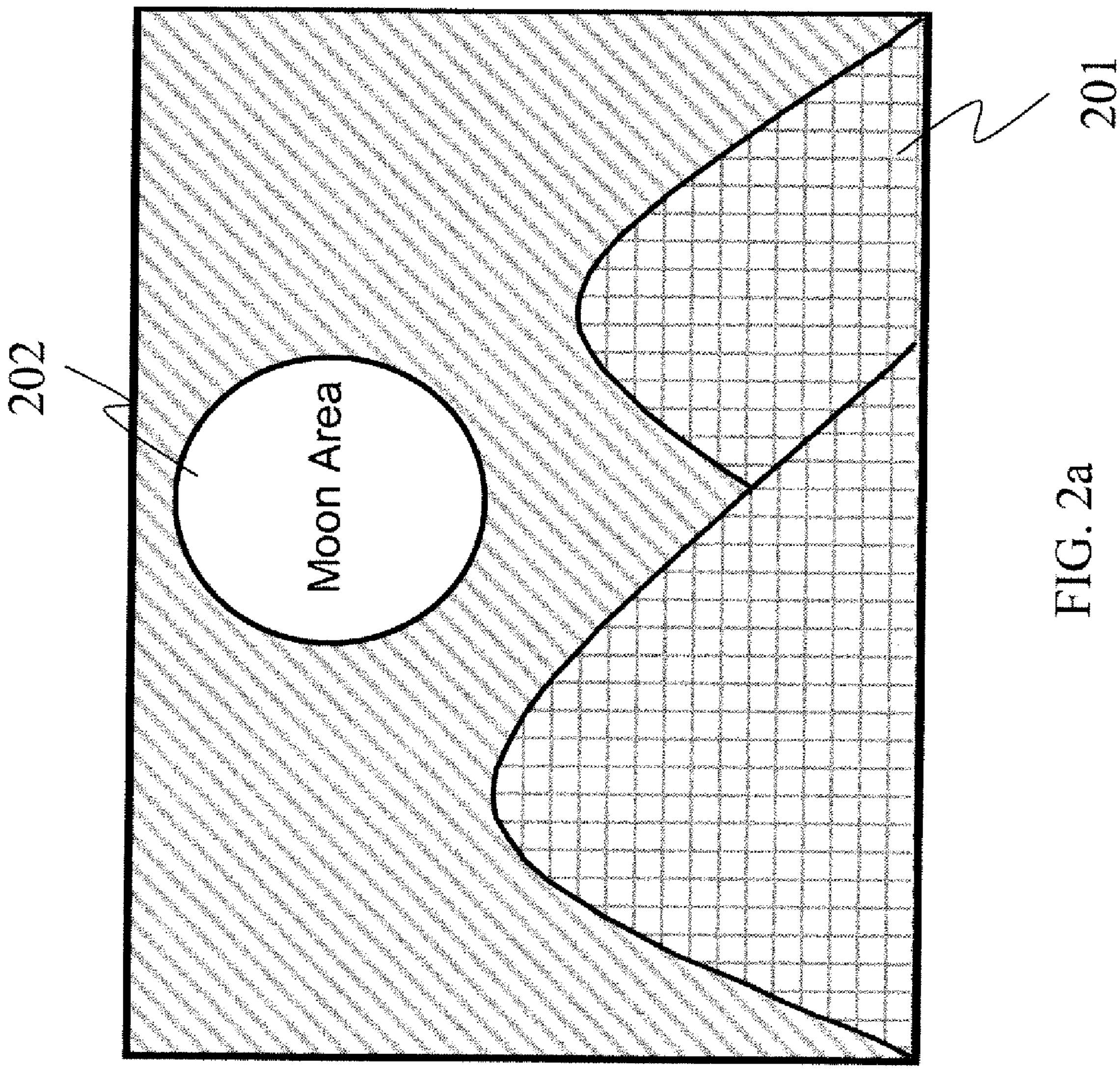
FIG. 2*a* shows an example image for illustrating the local contrast enhancement according to the presently claimed invention.
Figure 2B:
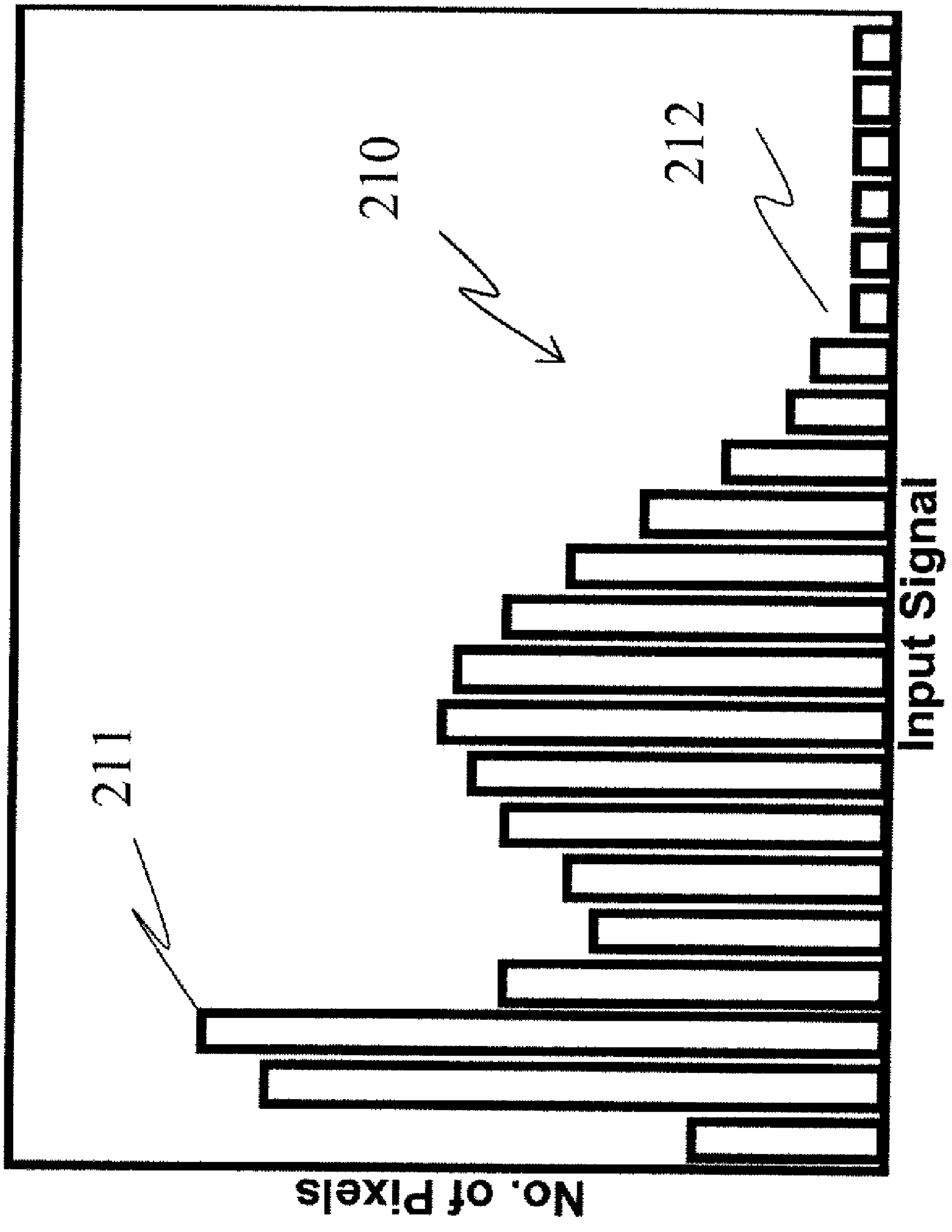
FIG. 2*b* shows a pixel intensity histogram corresponding to the example image in FIG. 2*a*.

FIG. 2*a* shows an example image for illustrating the local contrast enhancement according to the presently claimed invention. The example image contains a full moon 202 above mountains 201. FIG. 2*b* shows a pixel intensity histogram 210 corresponding to the example image in FIG. 2*a*. The pixels for the mountains 211 are relatively dark and are distributed to the low input signal part of the histogram 210, while the pixels of the moon 212 are relatively bright and are therefore distributed to the high input signal part of the histogram 210.

Figure 3B:
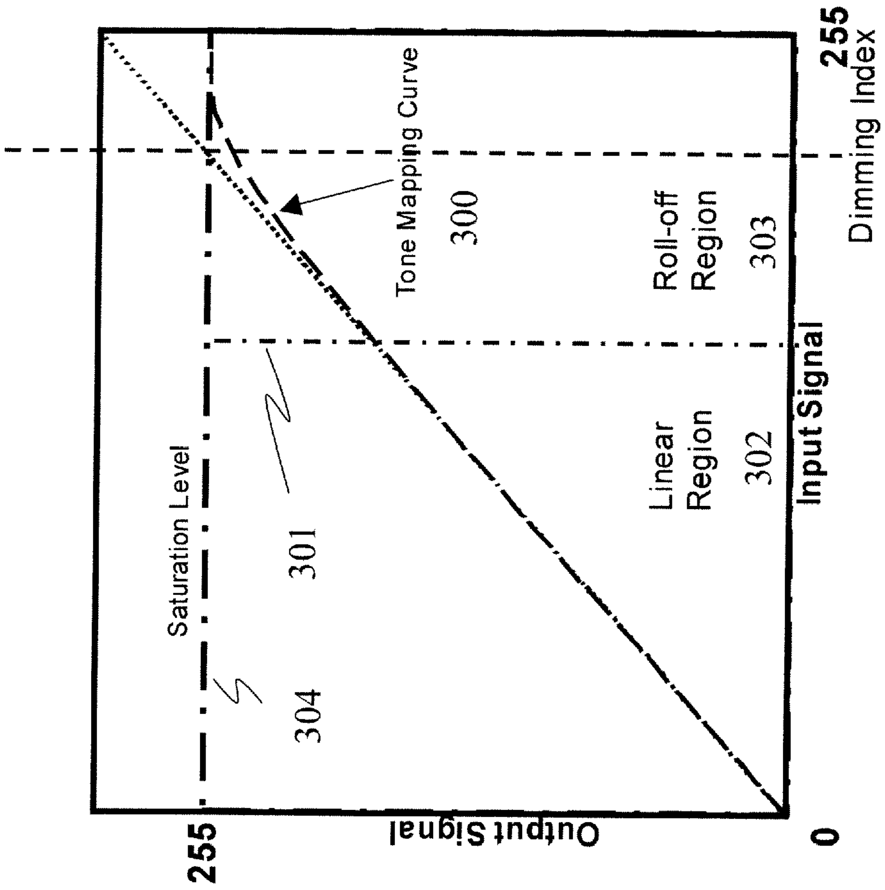
FIG. 3*b* shows an exemplary tone-mapping curve for tone mapping in FIG. 3*a*.
Figure 3A:
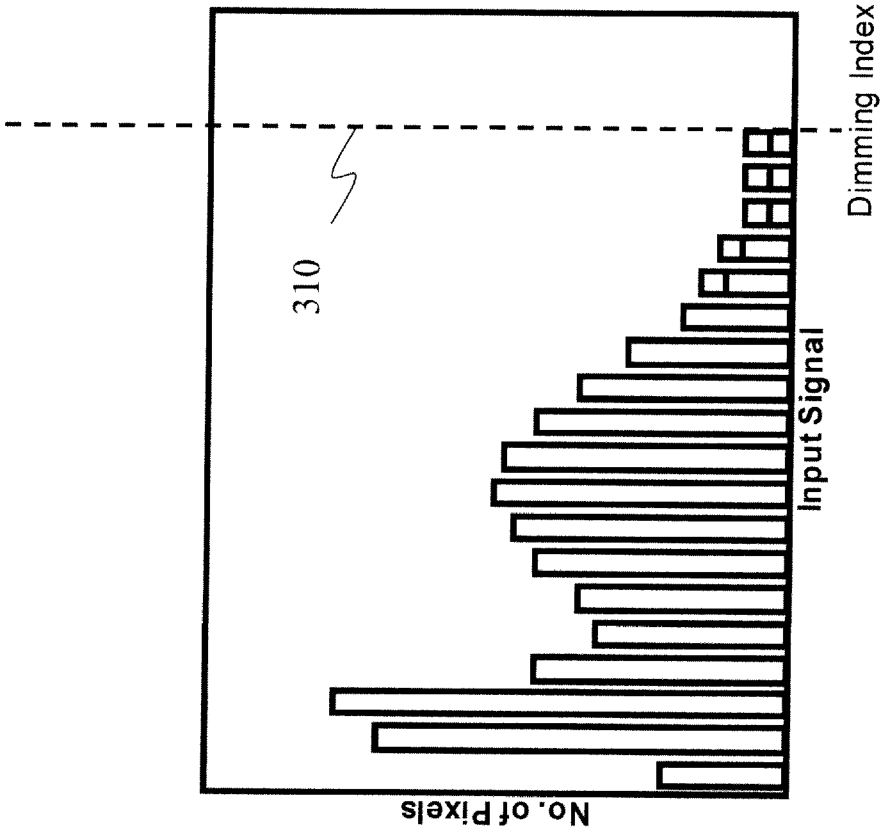
FIG. 3*a* shows a histogram of the example image in FIG. 2*a* after tone mapping.

In dynamic backlight control for a LCD where the backlight is dimmed for saving the backlight power, the image signal values are scaled up by tone mapping so as to keep the image brightness and contrast to remain perceptually the same. FIG. 3*a* shows a histogram of the example image in FIG. 2*a* after tone mapping and FIG. 3*b* is an exemplary tone-mapping curve for tone mapping in FIG. 3*a*. The characteristics of the tone-mapping curve 300, plotted as a dashed curve in FIG. 3*b*, can best be explained with reference to the two regions divided by the dotted dashed vertical line 301. One is a linear region 302 with a substantially constant slope in the tone-mapping curve 300. The other is a roll-off region 303 with changing slope in the tone-mapping curve 300 that diminishes with increasing brightness value of the image signal. For further power saving, dynamic backlight control can apply more dimming on the backlight, hence expanding the roll-off region 303. In the roll-off region 303, the image signal level becomes suppressed in approaching the saturation level 304. In contrast with FIG. 2*b*, the right side of the image pixels from the dimming index line 310 of FIG. 3*a* has been remapped to the left side.

Figure 4B:
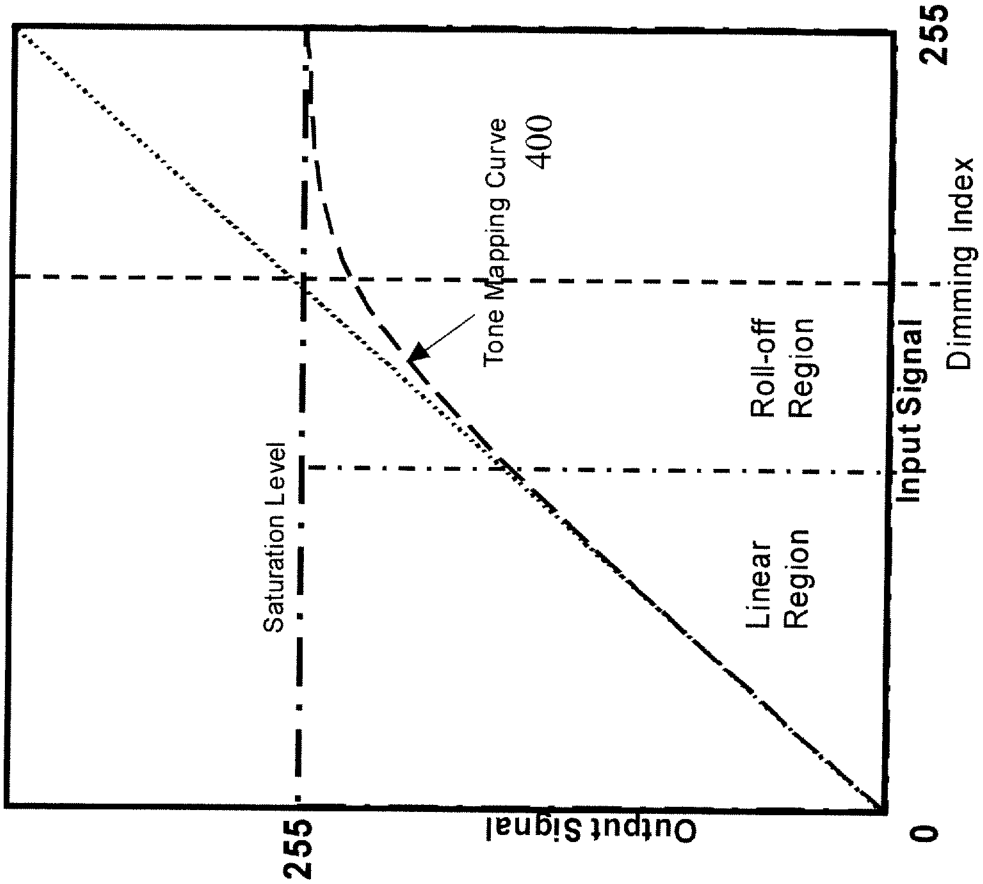
FIG. 4*b* shows an exemplary tone-mapping curve for tone mapping in FIG. 4*a*.
Figure 4A:
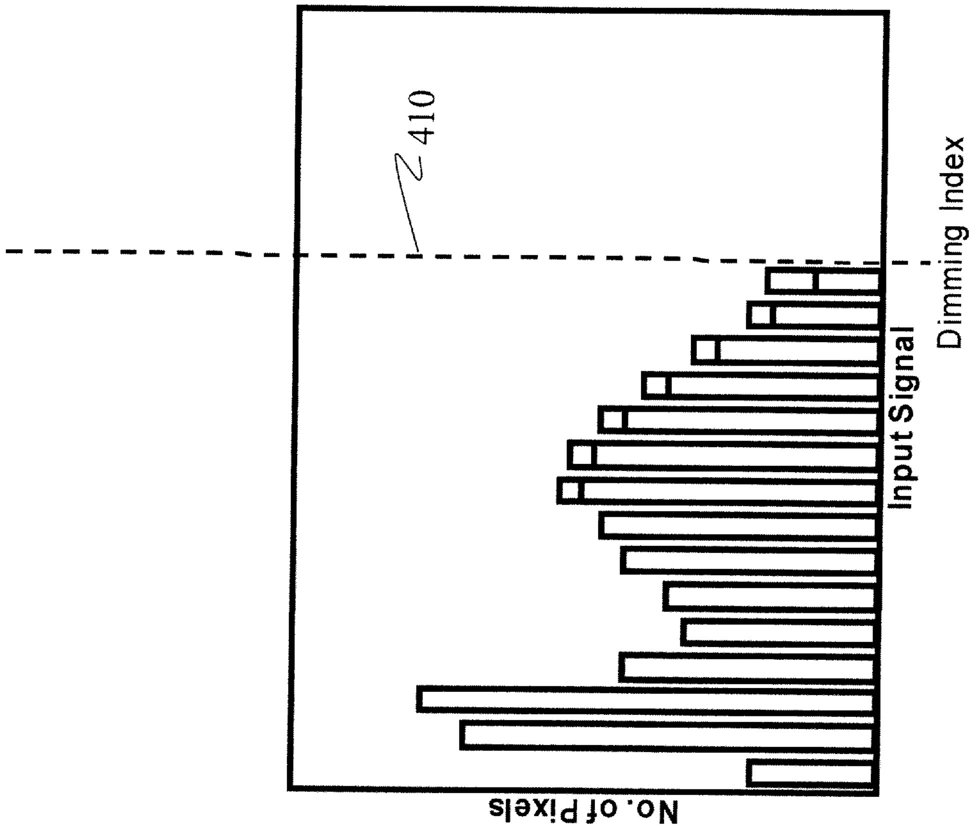
FIG. 4*a* shows a histogram of the example image in FIG. 2*a* after tone mapping under a different dimming index.

FIG. 4*a* shows a histogram of the example image in FIG. 2*a* after tone mapping under a different dimming index and FIG. 4*b* is an exemplary tone-mapping curve for tone mapping in FIG. 4*a*. If the dimming index line 410 shifts to the left, the roll-off region will be expanded and more pixels will be distributed to the left side in the histogram. The quality of the image is consequently degraded due to the characteristics of the tone-mapping curve 400 that have re-arranged the brightness level of the pixels.

Figure 5A:
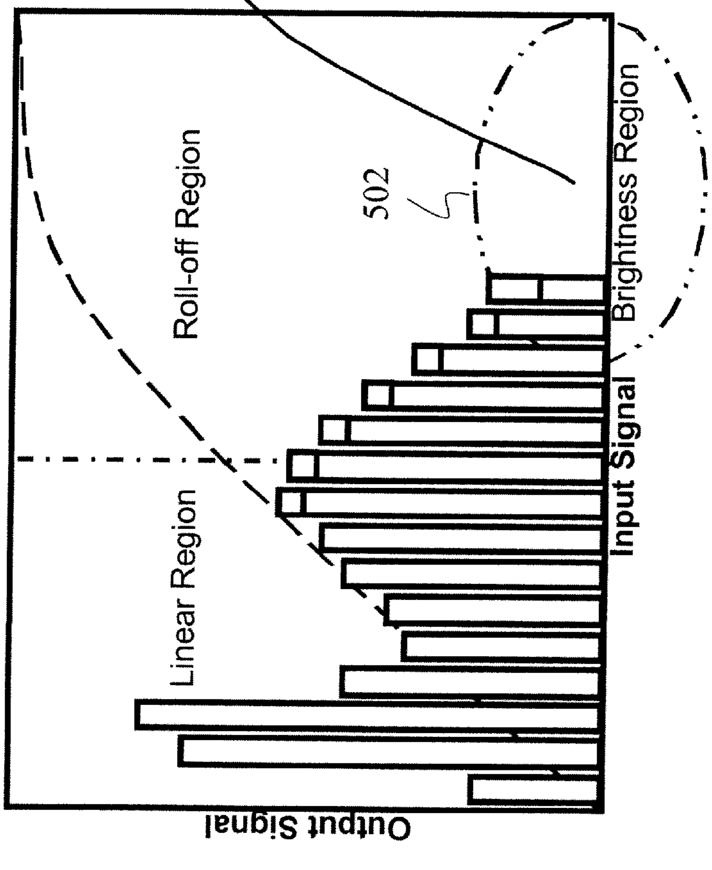
FIG. 5*a* is a histogram that illustrates the image loss due to tone mapping.
Figure 5B:
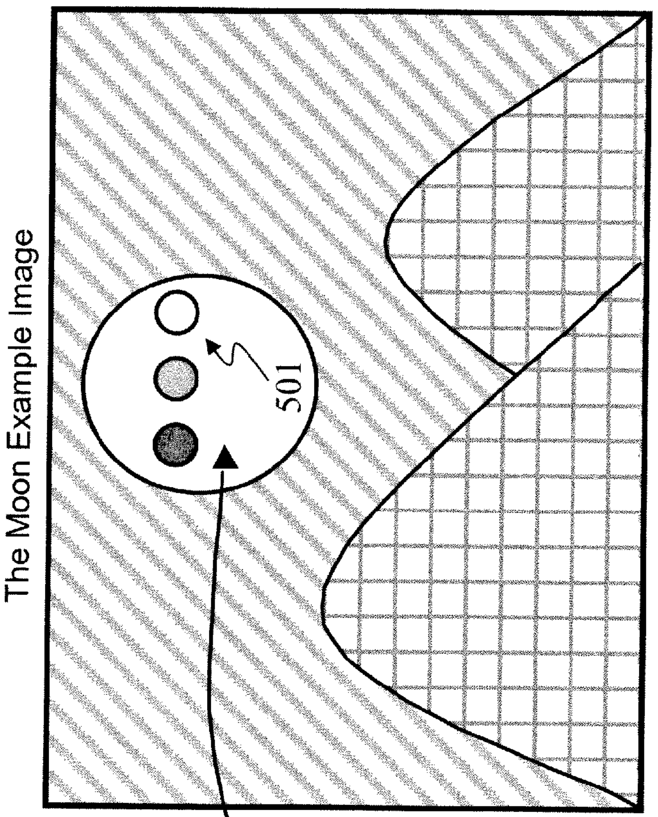
FIG. 5*b* is the example image corresponding to FIG. 5*a*.

FIG. 5*a* is a histogram that illustrates the image loss due to tone mapping and FIG. 5*b* is the example image corresponding to FIG. 5*a*. The details of the moon region 501 which corresponds to the brightness region 502 of the histogram are lost.

Figure 6A:
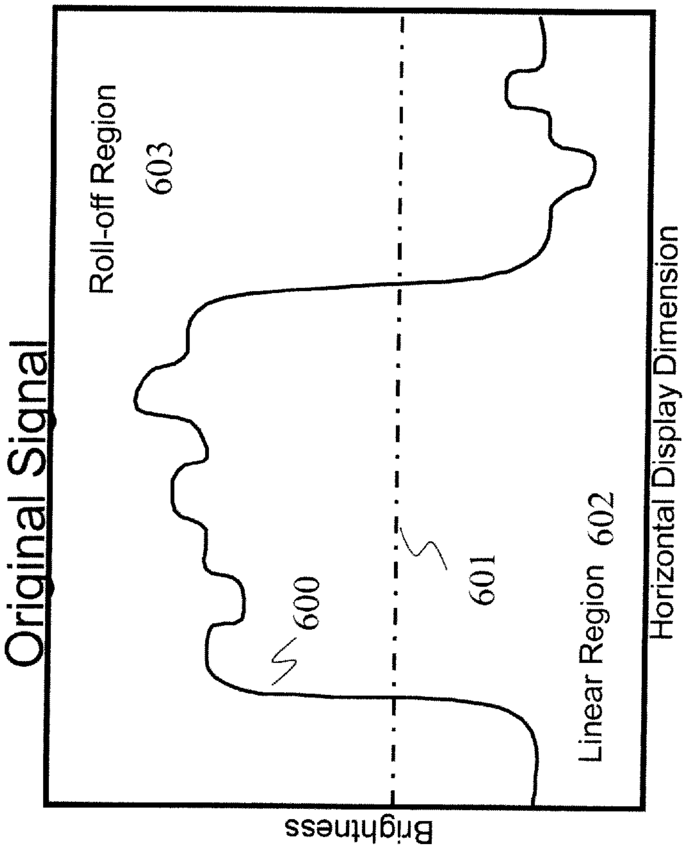
FIG. 6*a* illustrates an original image signal before tone mapping.

FIG. 6*a* illustrates an original image signal in the example image of FIG. 5*b* before tone mapping. For illustration purpose, the image signal 600 corresponds only to part of the example image of FIG. 5*b* and is plotted as a one dimensional curve. A horizontal dotted dashed line 601 is plotted to indicate the linear region 602 and the roll-off region 603.

Figure 6B:
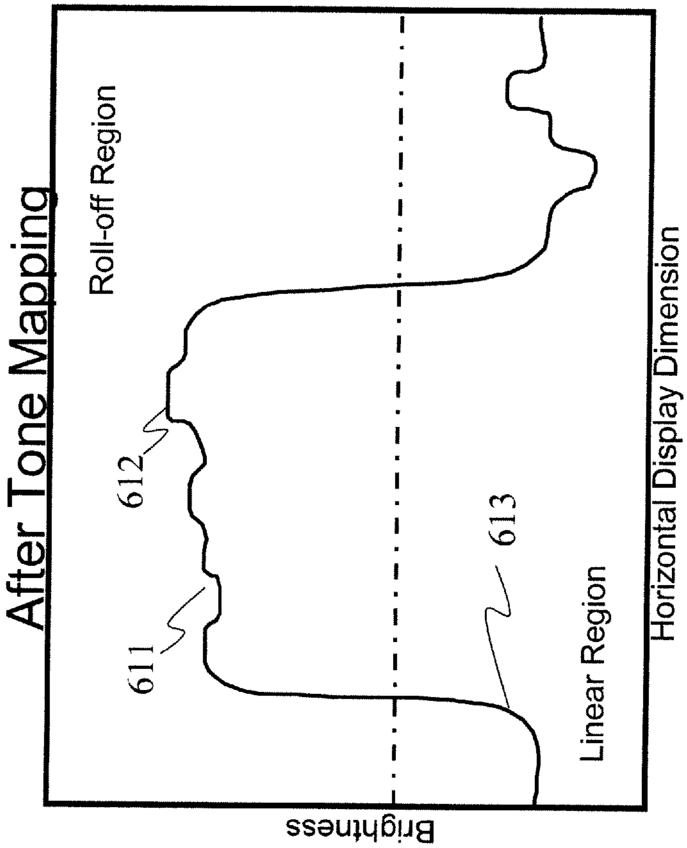
FIG. 6*b* illustrates the image signal in FIG. 6*a* after tone mapping without local contrast enhancement signal pre-processing.

FIG. 6*b* illustrates the image signal in FIG. 6*a* after tone mapping without local contrast enhancement signal pre-processing. The low brightness part of the signal 613 within the linear region exhibits nearly no degradation while the upper part of the signal within the roll-off region exhibits reduction of fine contrast signal 611 or even signal clipping 612 due to saturation level of the signal.

Figure 7A:
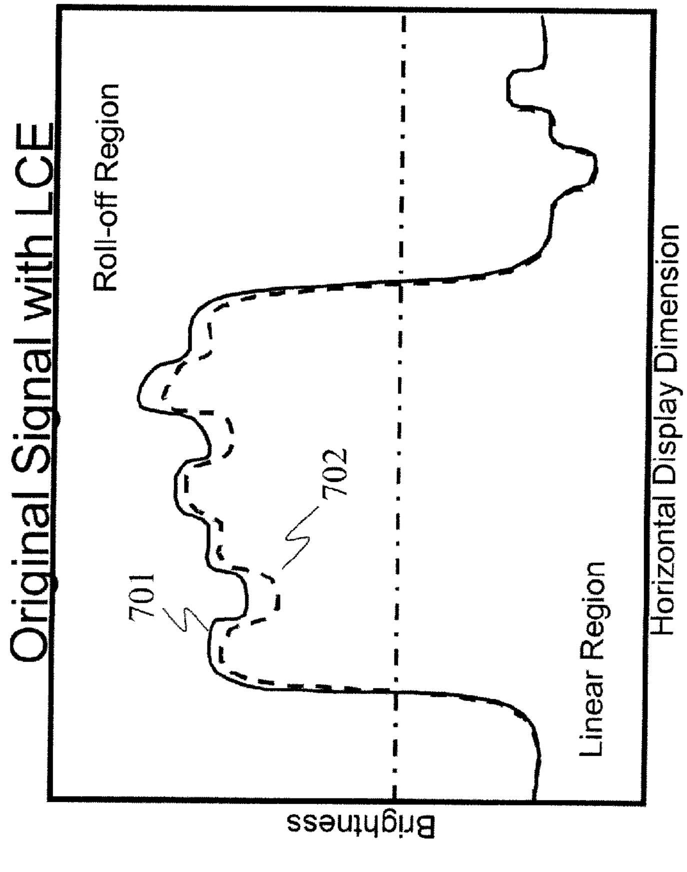
FIG. 7*a* illustrates an original image signal undergoing local contrast enhancement signal pre-processing according to the presently claimed invention.
Figure 7B:
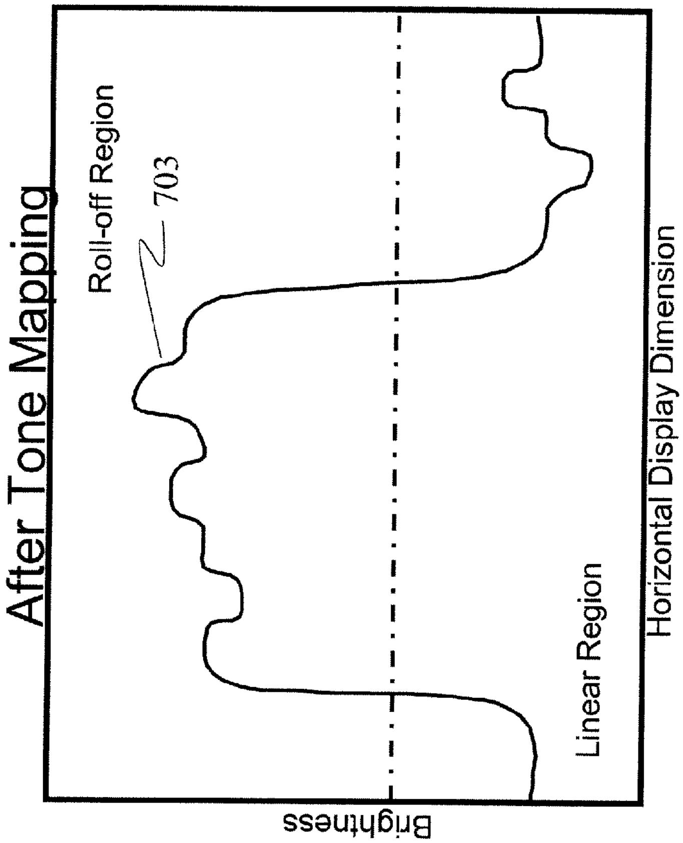
FIG. 7*b* illustrates the image signal in FIG. 7*a* after tone mapping.

FIG. 7*a* illustrates an original image signal undergoing local contrast enhancement signal pre-processing according to the presently claimed invention and FIG. 7*b* illustrates the image signal in FIG. 7*a* after tone mapping. In order to preserve the fine image contrast signal in the high brightness region, local contrast enhancement is applied to the image signal locally before the tone mapping such that fine image contrast can be retained after the tone mapping. The dashed curve 702 as shown in FIG. 7*a* represents the new updated output signal of the image signal 701, exhibiting the shading effect produced by the local contrast enhancement method of the exemplary embodiment. In FIG. 7*b*, the upper part of the signal 703 within the roll-off region retains the image contrast, whereas image degradation and signal clipping is successfully avoided.

Figure 8:
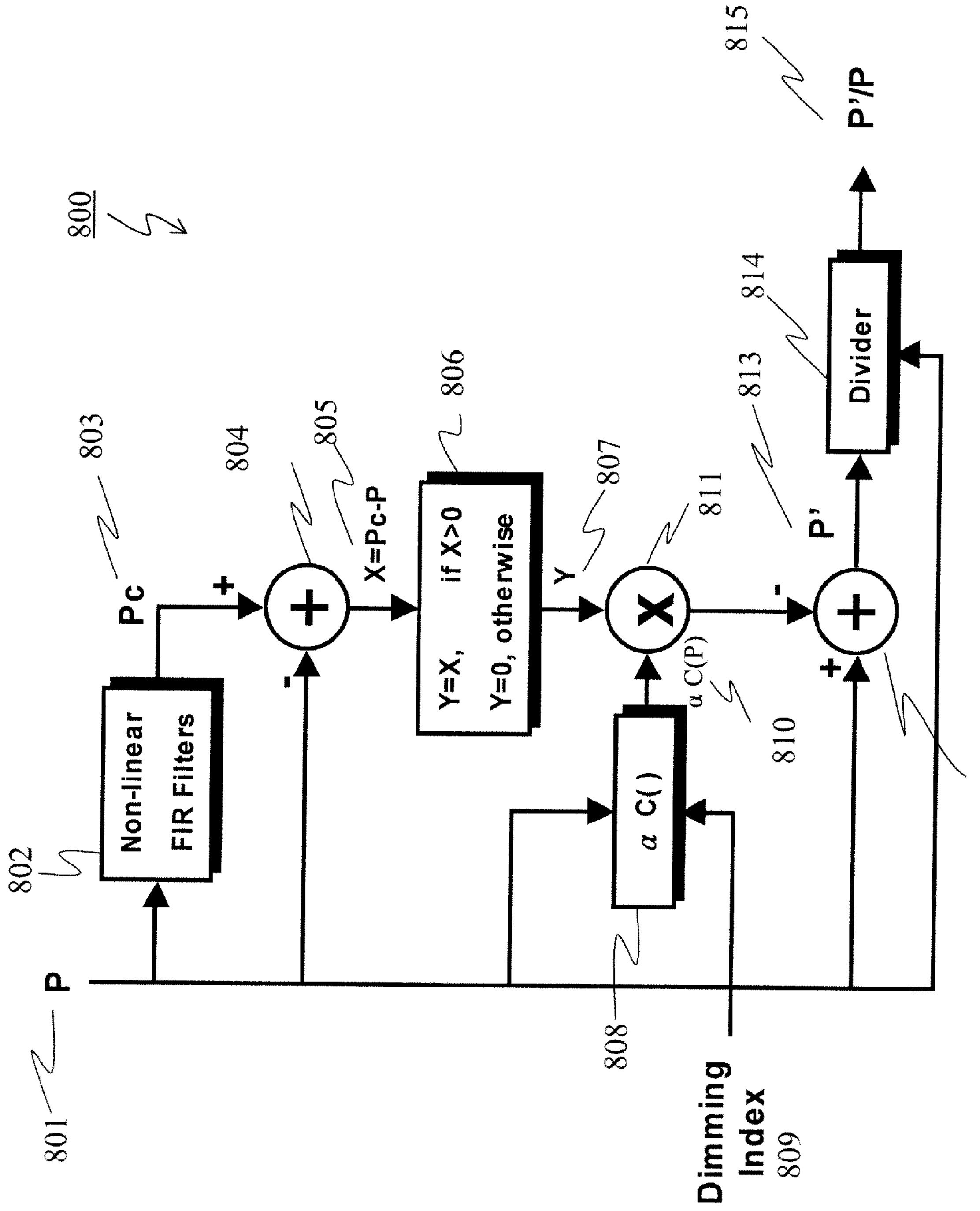
FIG. 8 shows an exemplary circuit diagram of local contrast enhancement according to the presently claimed invention.

FIG. 8 shows an exemplary circuit diagram 800 of local contrast enhancement according to the presently claimed invention. In an exemplary embodiment, the circuit flow starts by feeding in a representative image signal P 801 of an original image signal. According to one embodiment of the claimed invention, the representative image signal P 801 is selected from the largest signal among the RGB components of a pixel data by a multiplexer (not shown).

A profile signal Pc 803 is then calculated by non-linear FIR filters 802. According to one embodiment of the claimed invention, the profile signal Pc 803 is obtained by summing up the outputs of two filters, corresponding respectively to a weighted sum of the representative image signal P 801 and a weighted sum of the absolute signal variation of the representative image signal P 801. Assuming that P(n) is the representative image signal at the position n, and D(n) is the absolute variation between the values of P(n) 801 of the neighborhood pixels at the position n and n+1. The profile signal Pc(n) 803 is calculated as shown below by expression (3):

$$Pc(n) = \sum_{i=-w}^{w} w_1(i)P(n+i) + \sum_{i=-w}^{w} w_2(i)D(n+i) \tag{3}$$

where 2w+1 is the size of weighted sum filters; w1, w2 are the weighting coefficients of the weighted sum filters; and D(n)=|P(n+1)−P(n)| is the absolute signal variation of the representative image signal P(n) 801.

The window size of the filters can affect the sharpness of the enhancement effect, that is, the profile signal will change more sharply for narrower window and vice versa. When the change of profile signal is getting too sharp, it will give an undesirable artificial visual effect. Whereas the window size is too wide, the contrast enhancement effect will be diminished. Meanwhile, too large a window size may introduce image changes over an extended range visible to the eye.

In an exemplary embodiment, the weighting coefficients for both filters are symmetrical to avoid asymmetric enhancement visual effects. The sum of the coefficient for each filter is preferably in certain power of 2, that is, 4, 8, 16, 32, 64, 128, etc for ease of hardware implementation. An example of the weighting coefficients is: 4, 6, 8, 9, 10, 9, 8, 6, 4 where the sum is 64.

The representative image signal P 801 is then subtracted from the profile signal Pc 803 by adder 804 to obtain the envelop contrast signal X 805. Comparator 806 then checks the envelop contrast signal X 805 and assigns X 805 as the comparator output Y 807 if X 805 is larger than zero, otherwise comparator output Y 807 is set as zero. Meanwhile, the representative image signal P 801 is used to reference contrast value information stored in lookup table 808. The look up table stores a number of contrast curves corresponding to various dimming indexes. By inputting the image signal or representative image signal P 801, dimming index 809, and tuning parameter α, the lookup table 808 produces a contrast value αC(P) 810. Such contrast value αC(P) 810 is then multiplied with Y 807 by multiplier 811. The output of multiplier 811 is subtracted from the representative image signal P 801 to obtain the shaded image signal P' 813 by adder 812. Finally, the ratio P'/P 815 for color component scaling is computed by divider 814.

Figure 9B:
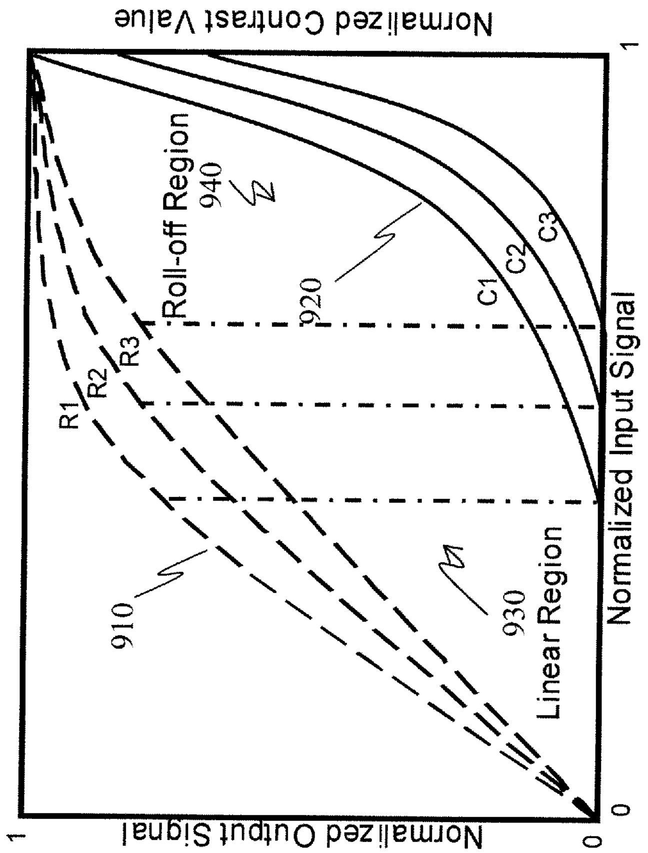
FIG. 9*b* shows the tone mapping curves and contrast curves corresponding to the contrast shading in FIG. 9*a*.
Figure 9A:
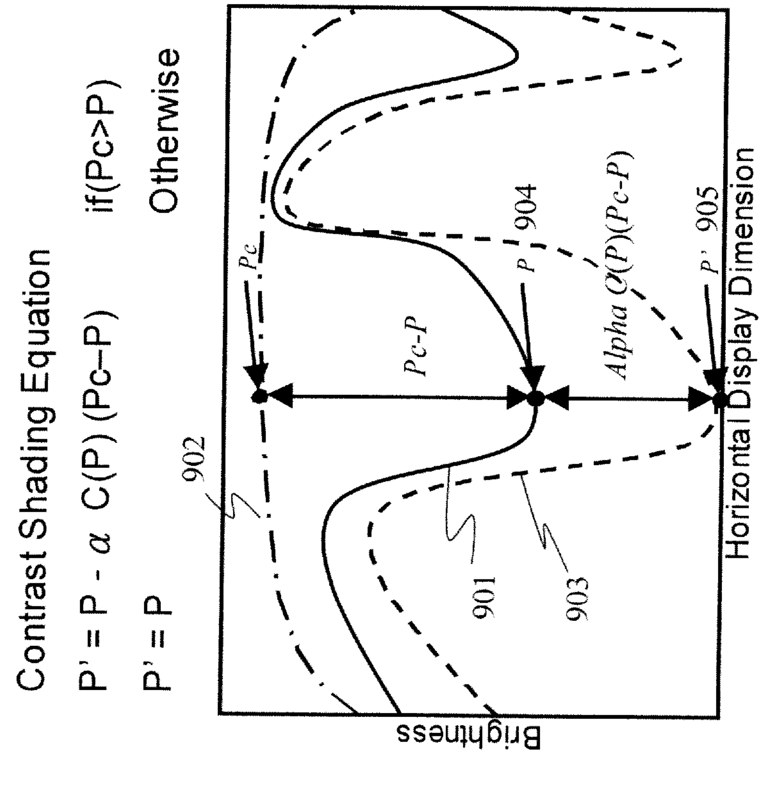
FIG. 9*a* illustrates the application of contrast shading in local contrast enhancement according to an embodiment of the presently claimed invention.

FIG. 9*a* illustrates the application of contrast shading in local contrast enhancement according to an embodiment of the presently claimed invention, while FIG. 9*b* shows the tone mapping curves 910 and contrast curves 920 corresponding to the contrast shading in FIG. 9*a*. For the compensation of the image loss due to tone-mapping curve 910, the values of P 901 and Pc 902 along the roll-off region 940 of the tone-mapping curve 910 can influence the contrast dynamics of the image. In order to compensate the loss of image details, a series of contrast curves C1, C2, C3 920 are defined for compensating the corresponding tone-mapping curves R1, R2, R3 910 and are stored in a lookup table. Usually the characteristics of the tone-mapping curves 910 can be classified as two regions: the linear region 930 and roll-off region 940. In one exemplary embodiment, the value of a contrast curve 920 is set as zero within the linear region 930 of the corresponding tone-mapping curve 910. The contrast curve 920 then rises as the slope of the tone-mapping curve 910 decreases in the roll-off region 930. The contrast curves 920 are determined so as to compensate for losses due to roll off effects of the tone-mapping curves 910. The compensation curve slope increases as the corresponding roll-off curve slope decreases. The relation of the compensation curve and tone-mapping curve also depends on display panel characteristics, human visual perception, and image contents.

In one exemplary embodiment, each contrast curve 920 is represented by a lookup table regarded as contrast shading table and is pre-defined for real-time hardware implementation.

Accordingly to an embodiment of the presently claimed invention, the compensation of the degradation due to tone-mapping curve is performed by updating a representative image signal P 904, plotted as a point along the solid curve 901, to a shaded image signal P' 905 on a pixel by pixel basis. In comparison to the solid curve 901 of the original representative image signal P 904, the contrast or the local signal variation of the dashed curve 903 of the shaded image signal P' 905 is enlarged or enhanced by signal shading. In an exemplary embodiment, the shaded value P' 905 is calculated from the original representative image signal P 904 according to the contrast shading equation as below:

$$P' = \begin{cases} P - \alpha(Pc - P)C(P) & \text{if } Pc > P \\ P & \text{Otherwise} \end{cases} \tag{4}$$

where C(P) is the contrast shading table for the compensation of tone-mapping curve and α is the parameter for tuning the degree of the contrast effect. The parameter α allows user preference control when desired, for personal preference on specific images. In an exemplary embodiment, α is set to unity to activate contrast enhancement while the contrast enhancement is turned off by setting α to zero.

As a result, the shaded value P' 905 is either lower or equal in value to the original representative image signal P 904. The local contrast in signal P 904 is enlarged by the calculated depressing of the signal valleys, which is referred to as signal shading.

Figures 10A, 10B:
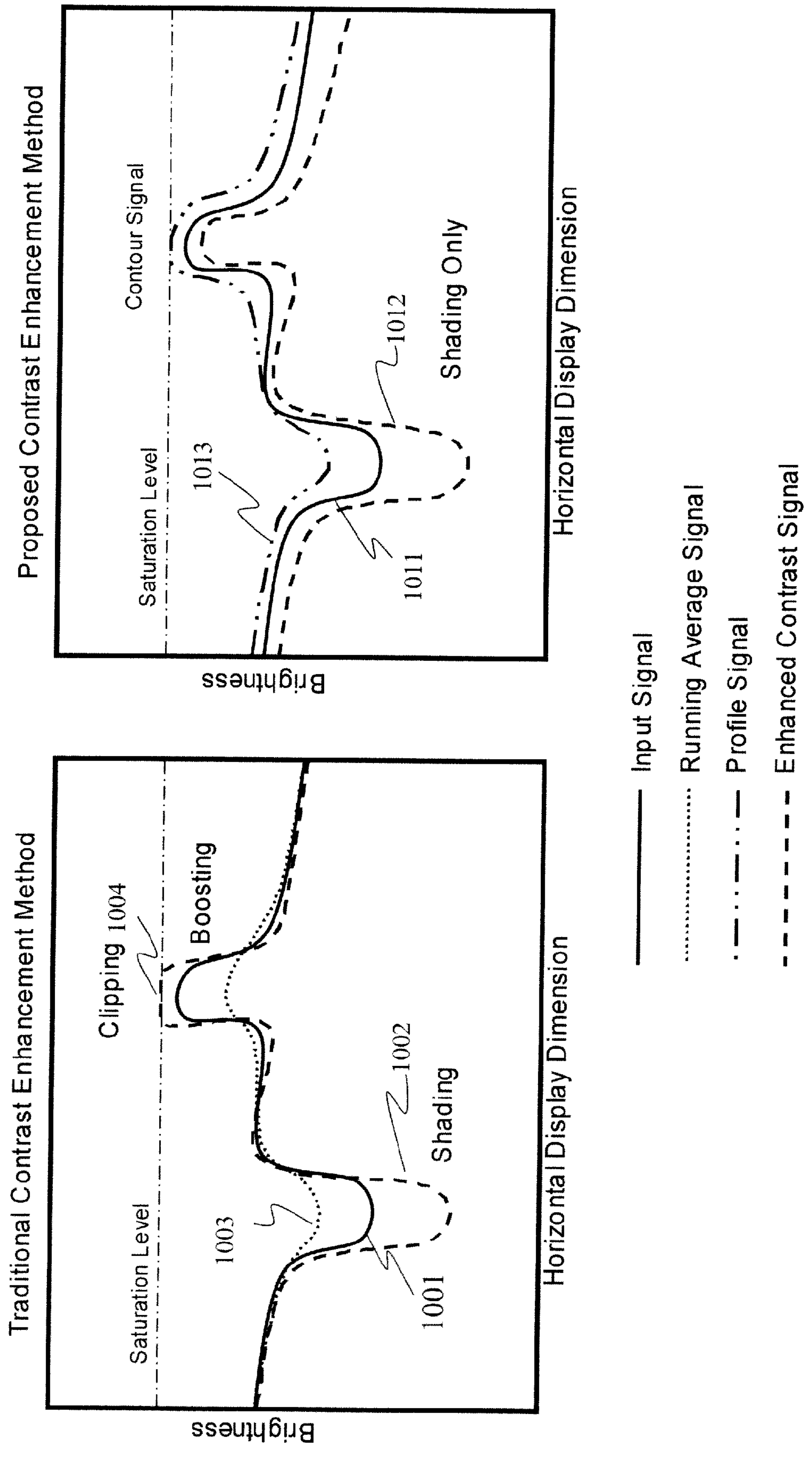
FIG. 10*a* shows an image signal before and after contrast enhancement under traditional methods.
FIG. 10*b* shows the same image signal in FIG. 10*a* after contrast enhancement under the presently claimed invention.

FIG. 10*a* shows an image signal before and after contrast enhancement under traditional methods. The solid curve 1001 represents an exemplary original image signal. The dashed curve 1002 represents the enhanced output signal. In conventional local contrast enhancement, a low pass signal plotted as dotted curve 1003 is used for enhancing the image signal with boosting and shading. However, clipping 1004 or saturation of the image signal may occur in the boosted signal if the original signal is already at a high level close to the system top level. Additional clipping or saturation of the boosted signal will result when tone-mapping is applied in dynamic backlight applications.

FIG. 10*b* shows the same image signal in FIG. 10*a* after contrast enhancement under the presently claimed invention. According to an embodiment of the presently claimed invention, the image local contrast signal 1012 is enlarged with shading only, thus avoiding the problems of clipping or saturation. In one exemplary embodiment, when the level of the profile signal 1013 is higher than that of the original image signal 1011, the output signal valleys are purposely lowered to enhance the local contrast.

Figures 11A, 11B:
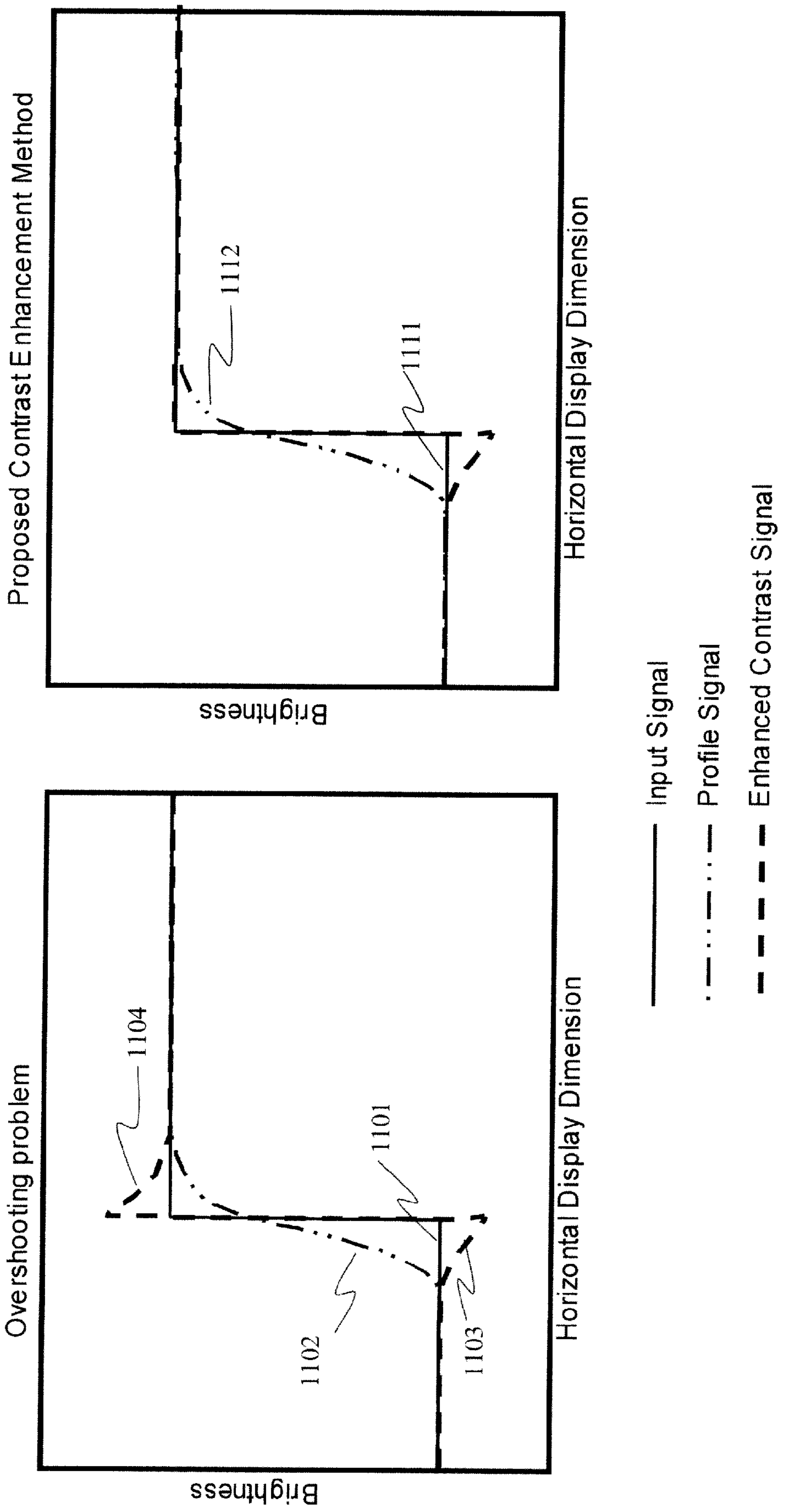
FIG. 11*a* illustrates the overshooting problem in an image signal after contrast enhancement under traditional methods.
FIG. 11*b* shows the same image signal in FIG. 11*a* after contrast enhancement under the presently claimed invention.

FIG. 11*a* illustrates the overshooting problem in an image signal after contrast enhancement under traditional methods. Such overshooting problem exists in sharp edge of image signals and is commonly found in GUI graphics when the level of the profile signal 1101 is lower than that of the image signal 1102, resulting in an abnormal bright edge 1104 in the enhanced contrast signal 1103.

FIG. 11*b* shows the same image signal in FIG. 11*a* after contrast enhancement under the presently claimed invention. In an exemplary embodiment, in order to remove the bright edge defect, the amount of the shading is set to zero when the level of the profile signal 1112 is lower than that of the image signal 1111. The overshoot problem is completely eliminated in accordance with equation (4) where amount of the shading is set to zero under the condition of Pc>P.

Figure 12:
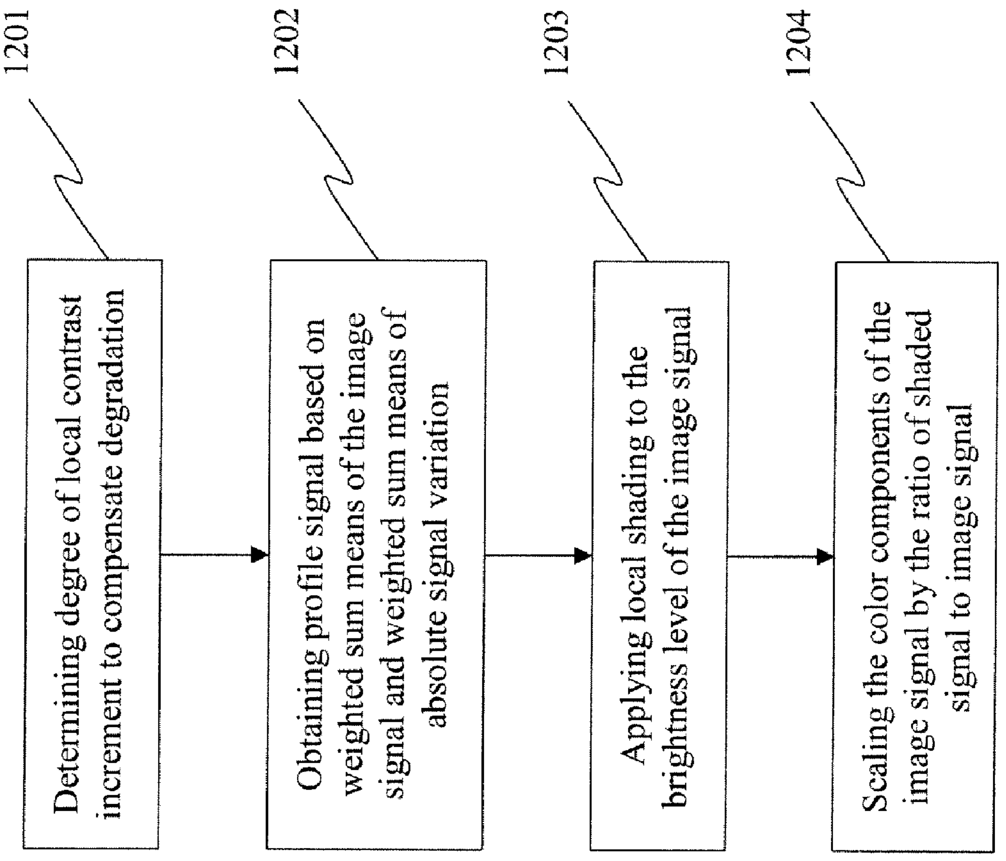
FIG. 12 shows a flow diagram illustrating the method of local contrast enhancement on an image signal in accordance with an embodiment of the presently claimed invention.

FIG. 12 is a flow diagram illustrating the method of local contrast enhancement on an image signal in accordance with an embodiment of the presently claimed invention. The method enhances image quality in tone mapping applications and starts at determining step 1201, where the degree of local contrast increment for an image signal is determined to compensate degradation due to tone mapping. In filtering step 1202, a profile signal is obtained by summing the weighted sum means of a plurality of neighboring pixels and the weighted sum means of the absolute variation of said plurality of neighboring pixels. In shading step 1203, local shading is applied to the brightness level of the image signal, wherein the local shading is in proportion to the degree of local contrast increment and to the difference between said image signal and said profile signal.

In an exemplary embodiment, the strongest signal among the color components of an image signal is selected as the primary representative image signal to be applied with local shading. The local shading then produces a shaded image signal, wherein said local shading is in proportion to said degree of local contrast increment and to the difference between said primary representative image signal and said profile signal.

In scaling step 1204, the color components are adjusted proportionally by a RGB scaling process to keep the color characteristics of the pixel. In one exemplary embodiment, the representative value P and its shaded value P' are used to modify its RGB components by scaling each component value with the ratio P'/P by means of a divider and three multipliers as shown below:

$$R'=R(P'/P)$$

$$G'=G(P'/P)$$

$$B'=B(P'/P) \qquad (5)$$

Besides RGB, the color components of an image signal may be determined in accordance with color models such as CMYK, HSV, HSL, YUV and YIQ.

By using the method and apparatus of this invention, the fine contrast details of the image in the high brightness region can be preserved with a low hardware cost. An aggressive power saving for dynamic backlight control system can be achieved by the application of the presently claimed invention.

The foregoing description of embodiments of the present invention are not exhaustive and any update or modifications to them are obvious to those skilled in the art, and therefore reference is made to the appending claims for determining the scope of the presently claimed invention.

We claim:

1. A method of local contrast enhancement on an image signal to enhance image quality in tone mapping applications in a dynamic backlight control system, comprising:

determining the degree of local contrast increment for an image signal to compensate degradation due to tone mapping;

obtaining a profile signal based on a weighted sum means of said image signal and a weighted sum means of the absolute variation of said image signal; and applying local shading to the brightness level of said image signal if said profile signal is larger than said image signal, wherein said local shading is in proportion to said degree of local contrast increment and to the difference between said image signal and said profile signal.

2. The method of local contrast enhancement according to claim 1, wherein said obtaining a profile signal further comprises summing the weighted sum means of a plurality of neighboring pixels and the weighted sum means of the absolute variation of said plurality of neighboring pixels.

3. The method of local contrast enhancement according to claim 1, further comprising:

selecting the strongest signal among the color components of said image signal as a primary representative image signal for obtaining said profile signal;

applying local shading to said primary representative image signal to produce a shaded image signal if said profile signal is larger than said image signal, wherein said local shading is in proportion to said degree of local contrast increment and to the difference between said primary representative image signal and said profile signal; and scaling the color components of said primary representative image signal by the ratio of said shaded image signal to said primary representative image signal to achieve local contrast enhancement of said image signal.

4. The method of local contrast enhancement according to claim 3, wherein said color components of an image signal are determined in accordance with color models selected from the group consisting of: RGB, CMYK, HSV, HSL, YUV and YIQ.

5. The method of local contrast enhancement according to claim 1, wherein said local contrast enhancement is applied to dynamic backlight control for LCD application to minimize signal degradation or signal saturation.

6. The method of local contrast enhancement according to claim 1, wherein said obtaining a profile signal comprises calculating $$Pc(n)=\sum_{i=-w}^{w} w_1(i)P(n+i)+\sum_{i=-w}^{w} w_2(i)D(n+i)$$

as said profile signal;

where P(n) is the image signal at position n;

D(n) is the absolute variation between the values of the neighboring pixels at the position n and n+1 and is expressed as $D(n)=|P(n+1)-P(n)|$;

2w+1 is the size of weighted sum filters; and w1, w2 are the weighting coefficients of the respective weighted sum filters.

7. The method of local contrast enhancement according to claim 1, wherein said applying local shading comprises calculating $P-\alpha(Pc-P)C(P)$ as a shaded image signal if Pc is larger than P; and otherwise determining said shaded image signal as P; where P is the image signal; Pc is the profile signal of the image signal; C(P) is the contrast shading for P to compensate tone-mapping; and α is the degree of contrast effect.

8. The method of local contrast enhancement according to claim 1, wherein said scaling the color components comprises calculating I'=I(P'/P); where I is a color component; I' is the scaled color component of I; P is the image signal; and P' is the shaded image signal of P.

9. An apparatus of local contrast enhancement on an image signal to enhance image quality in tone mapping applications in a dynamic backlight control system, comprising:

a first filter for producing a weighted sum of image signal over a plurality of neighboring pixels in an image;

a second filter for producing a weighted sum of the absolute variations of said image signal over said plurality of neighboring pixels;

an adder for producing a profile signal by adding the outputs from said first filter and said second filter;

a processor for applying local shading to the brightness level of said image signal if said profile signal is larger than said image signal, wherein said local shading is in proportion to said degree of local contrast increment and to the difference between said image signal and said profile signal.

10. The apparatus of local contrast enhancement according to claim 9, further comprising:

a multiplexer for selecting the strongest signal among the color components of an image signal as a primary representative image signal;

a processor for applying local shading to said primary representative image signal to produce a shaded image signal if said profile signal is larger than said image signal, wherein said local shading is in proportion to a preferred degree of local contrast increment and to the difference between said primary representative image signal and said profile signal; and a multiplier for scaling the color components of said primary representative image signal by the ratio of said shaded image signal to said primary representative image signal to achieve local contrast enhancement of said image signal.

11. The apparatus of local contrast enhancement according to claim 10, further comprising a lookup table for storing said preferred degree of local contrast increment corresponding to the level of said image signal; wherein said preferred degree of local contrast increment compensates the degradation due to tone-mapping.

12. The apparatus of local contrast enhancement according to claim 10, further comprising a plurality of lookup tables corresponding to different levels of dynamic backlight control for LCD application.

13. The apparatus of local contrast enhancement according to claim 9, wherein said first filter calculates $$\sum_{i=-w}^{w} w_1(i)P(n+i);$$

said second filter calculates $$\sum_{i=-w}^{w} w_2(i)D(n+i);$$

said adder calculates $$Pc(n) = \sum_{i=-w}^{w} w_1(i)P(n+i) + \sum_{i=-w}^{w} w_2(i)D(n+i)$$

as said profile signal; where

P(n) is the image signal at position n;

D(n) is the absolute variation between the values of the neighboring pixels at the position n and n+1 and is expressed as D(n)=|P(n+1)−P(n)|;

2w+1 is the size of said first filter and said second filter;

$w_1$ are the weighting coefficients of said first filter; and $w_2$ are the weighting coefficients of said second filter.

14. The apparatus of local contrast enhancement according to claim 9, wherein said processor calculates P−α(Pc−P)C(P) as a shaded image signal if Pc is larger than P; and otherwise determining said shaded image signal as P; where P is the image signal; Pc is the profile signal of the image signal; C(P) is the contrast shading for P to compensate tone-mapping; and α is the degree of contrast effect.

15. The apparatus of local contrast enhancement according to claim 9, wherein said multiplier calculates I'=I(P'/P); where I is a color component; I' is the scaled color component of I; P is the image signal; and P' is the shaded image signal of P.

* * * * *